No. 646,646. Patented Apr. 3, 1900.
L. G. KRUEGER.
COMBINED PULVERIZER AND HARROW.
(Application filed Oct. 21, 1899.)
(No Model.) 3 Sheets—Sheet 1.
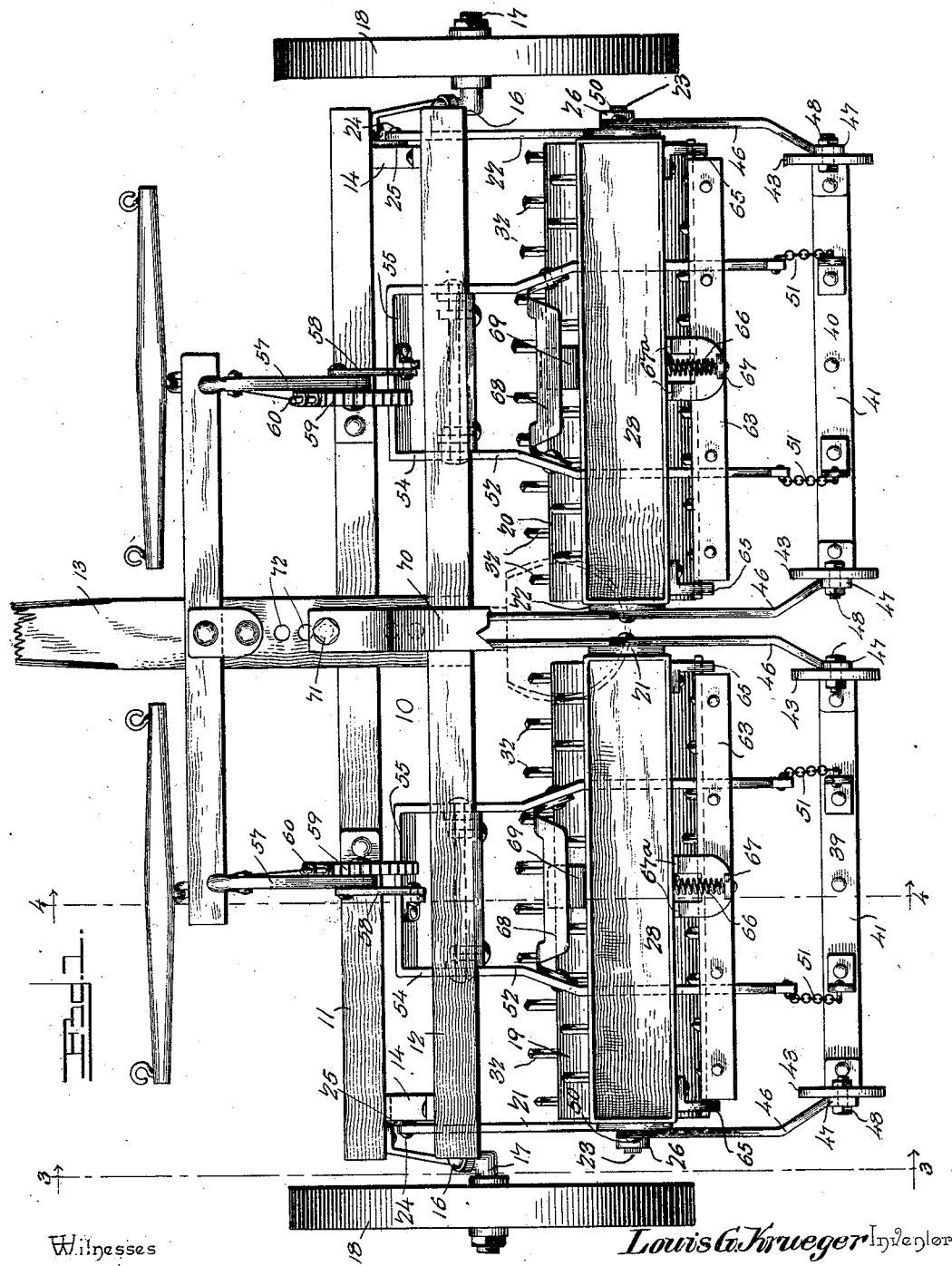
Witnesses
E. F. Stewart.
H. F. Bernhard
Louis G. Krueger, Inventor
By his Attorneys,
C. A. Snow & Co.

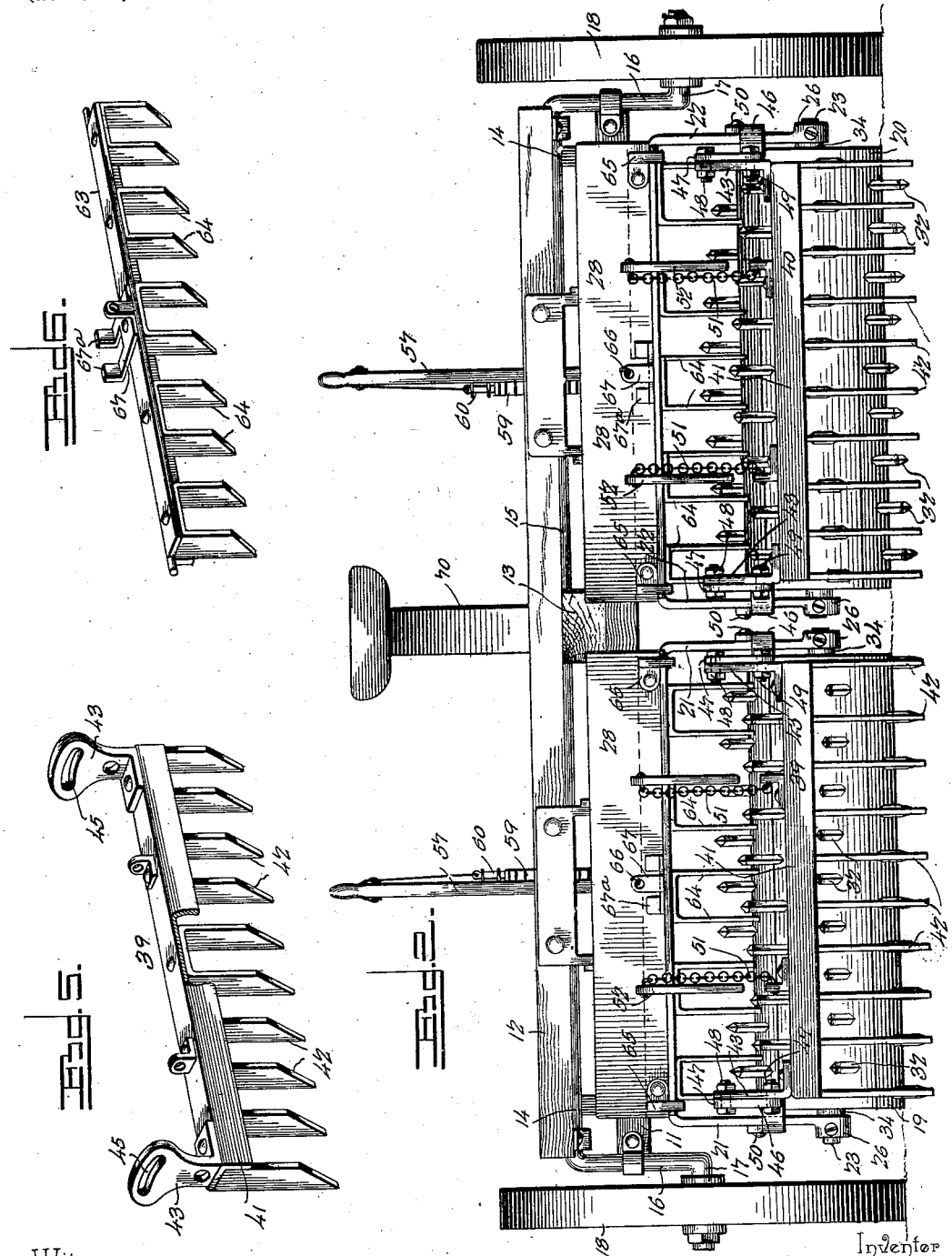

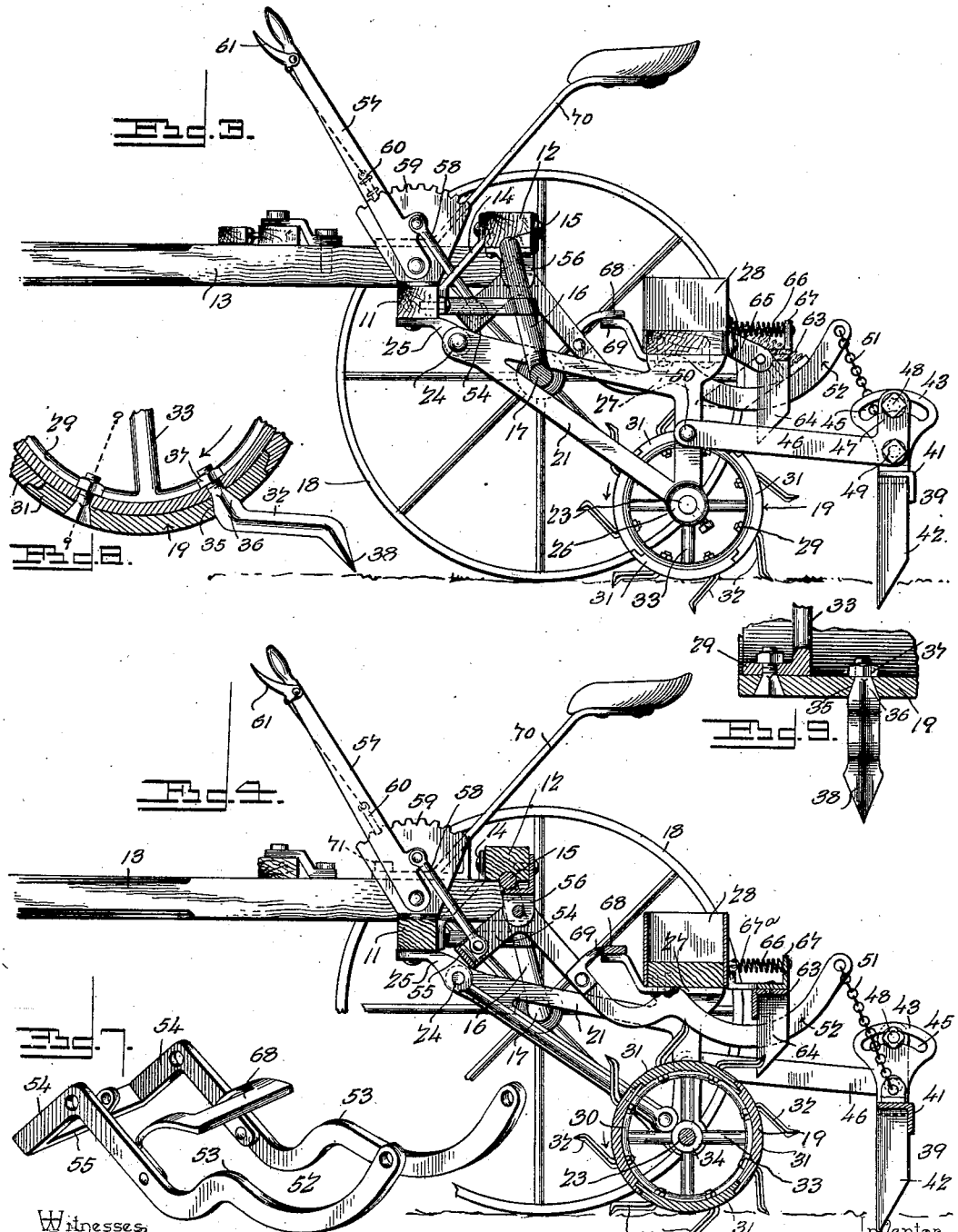

UNITED STATES PATENT OFFICE.

LOUIS GEO. KRUEGER, OF WRIGHTSTOWN, WISCONSIN.

COMBINED PULVERIZER AND HARROW.

SPECIFICATION forming part of Letters Patent No. 646,646, dated April 3, 1900.

Application filed October 21, 1899. Serial No. 734,375. (No model.)

*To all whom it may concern:*

Be it known that I, LOUIS GEO. KRUEGER, a citizen of the United States, residing at Wrightstown, in the county of Brown and State of Wisconsin, have invented a new and useful Combined Pulverizer and Harrow, of which the following is a specification.

My invention relates to improvements in a combined pulverizer and harrow, also adapted for use to good advantage as a clod-crusher; and one object in view is to provide a comparatively simple and easily-controlled machine which will operate efficiently on hard ground or wet land to thoroughly spade the earth, to smooth and level the soil, and to crush any clods in the path of the machine.

A further object is to provide a cleaner mechanism operable in conjunction with a rotary spading and crushing cylinder for keeping the latter in a condition free from accumulations of clay, roots, and weeds, thus contributing to the efficiency of the machine.

A further object of the invention is to provide a harrow mechanism which not only serves to smooth and level the soil, so as to leave it in good condition for planting, but is arranged to serve in a measure as a counterpoise to the machine in order to take the weight off the horses' necks.

A further object is to provide a machine which can be easily turned at the end of the trip across the field without hindrance from the soil-treating appliances and also to equip the machine with means for adjusting the cylinders and harrows out of operative positions with a view to facilitating transportation of the entire structure along rough roads or from one field to another.

With these ends in view the invention consists in the novel combination of elements, in the subcombinations of parts, and in the novel construction and the arrangement of the devices, which will be hereinafter fully described and claimed.

In the drawings, Figure 1 is a plan view of a combined pulverizer and harrow constructed in accordance with my invention. Fig. 2 is a rear elevation of the machine shown by Fig. 1. Fig. 3 is a vertical sectional elevation on the plane indicated by the dotted line 3 3 of Fig. 1, showing the cranked axle in section and the several parts of the machine in elevation. Fig. 4 is a central vertical section through one member or section of the machine on the plane indicated by the dotted line 4 4 of Fig. 1. Fig. 5 is a detail perspective view of one of the harrow-sections arranged to trail in rear of one spading and crushing cylinder. Fig. 6 is a detail perspective view of one cleaner-rake adapted to be supported pivotally on a weight-box for the teeth of said rake to occupy an active relation to the toothed spading-cylinder for keeping the latter free from accumulations of soil and trash. Fig. 7 is a detail perspective view of a lifter-bail operable in conjunction with a lever for raising one section of the machine out of operative position.

The same numerals of reference are used to indicate like and corresponding parts in each of the several figures of the drawings.

In carrying my invention into practice I employ a main wheeled frame, on which is hung a pair of spading and crushing cylinders adapted to yield independently of each other to follow the irregularities in the contour of the soil, and with each cylinder are associated a cleaner-rake and a harrow-section, said cleaner-rake being disposed in active relation to the cylinder for the purpose of keeping the latter free from accumulations of refuse, while the harrow-section is adapted to trail in rear of the cylinder, so as to complete the reduction of the soil and to level or smooth the same.

The main frame 10 consists, essentially, of horizontal bars 11 12, arranged one in rear of the other and in different horizontal planes, a tongue 13, and metallic connecting-plates 14, which are fastened to the ends of the frame-rails 11 12. The draft-tongue 13 is inserted between and united firmly to the frame-rails at the middle thereof, and this tongue, together with the plates 14, serves to unite the frame-rails together in a substantial manner, thereby producing a frame of exceedingly simple and strong construction. The machine-axle 15 extends entirely across the frame-rail 12, on the under side thereof, so as to be united firmly thereto, said axle having the crank-arms 16, which terminate in the wheel-spindles 17, said spindles supporting the carrying-wheels 18, which may be of any suitable or preferred construction. The crank-arms of the machine-axle extend in a downward and rearward direction from the rear cross-rail 12 of the machine-frame, so that the wheel-spindles lie in horizontal planes in rear of the main carrying-frame for the purpose of mounting the machine-frame in a manner to have the spading-cylinders and harrow-sections serve to counterpoise the weight of the machine and remove the same from the horses' necks.

The spading and crushing cylinders 19 20 of my machine are disposed in rear of the main frame 10 and on opposite sides of the draft-tongue 13, said cylinders being connected independently with the main frame and free to move or give in order to closely follow the contour of the ground. Each cylinder is carried or supported by a pair of hangers 21 22 and an axle 23, the cylinder being mounted loosely on the axle, so as to turn idly or freely thereon, while the hangers have pivotal connection with one of the cross-rails of the main frame. Each hanger 21 or 22 is cast in a single piece of metal of substantially-triangular form, with hub portions 26 at its lower rear angle or corner, and each hanger is furthermore provided with an attaching-plate 27 at its upper rear angle or corner for the purpose of supporting a weight-box, as will presently appear. The hangers are disposed in parallel relation at the ends of the cylinder which they are designed to support, said hangers having their forward ends pivoted at 24 to brackets 25, which are fixed in a suitable way to the under side of the front cross-rail 11 on the machine-frame. The axle 23 passes centrally and longitudinally through the hollow cylinder or drum, said axle having its end portions secured in the hubs 26 of the hangers in order that the axle may occupy a stationary position with relation to the drum. The weight-box 28 is disposed in a substantially-horizontal position over the cylinder in substantially the vertical plane thereof, and this weight-box has its bottom fastened to the attaching-plates 27 of the hangers, whereby said hangers are made to operatively connect the cylinder and the weight-box with the main frame.

The cylinders or drums of my machine are constructed in a peculiar manner for the teeth thereof to spade and pulverize the ground, and I will now proceed to describe the preferred construction of one of said cylinders, it being understood that the series of two cylinders which I prefer to employ are the same in construction. Each cylinder has two or more heads 29 30, a series of segmental sections 31, and a series of teeth 32 on each cylinder-section 31. The heads 29 30 are cast in a single piece of metal with spokes 33 and long hubs 34, and the sections 31 are fastened to the heads in a peculiar manner, so as to connect said heads for the production of a substantial cylinder. The elongated hubs 34 of the cylinder-heads are fitted loosely on the non-revoluble cylinder-axles 23 in order that the cylinders may rotate freely on the axles without end thrust or pressure on the machine-frame. The cylinder-sections 31 may each be cast in a single piece of metal, so that said cylinder-sections may be assembled on the heads 29 30 to abut one against the other and complete the cylinder. Said cylinder-sections are provided with tapered holes 35, designed to receive the similarly-tapered shanks 36 on the cylinder-teeth 32, said teeth being fastened in place by means of nuts 37, which are screwed on the threaded shanks 36 and arranged to bind against the inner surface of the cylinder-sections. The teeth 32 at the ends of the cylinder pass through the openings in the cylinder-sections and through correspondingly-alined openings in the cylinder-heads, whereby the nuts 37 on the end teeth of the cylinder operate not only to attach the teeth to a cylinder, but to fasten the cylinder-sections to the heads, thus simplifying the construction. The employment of tapering openings in the cylinder-sections for the reception of the threaded shanks on the spading-teeth provides for the attachment of said teeth with a wedging action, thus contributing to the strength and security of the joint between the spading-teeth and the cylinder. Each tooth has at its free extremity a beveled or diamond-shaped point 38, which facilitates the penetration of the ground. Each cylinder-section is represented as carrying two series of teeth, which are arranged in staggered relation, so as to have the middle teeth of each series disposed in advance of the remaining teeth in said series, thus making the teeth enter the soil successively. The curvature given to the teeth and the double bevel or diamond form of the points thereof cause the teeth to readily penetrate the ground, and as the toothed cylinder is subjected to the weight which may be contained in the weight-box that is carried by the same hangers which connect the cylinder to the frame said cylinder is caused to operate efficiently on hard ground as well as in soft or wet soil.

I contemplate the employment of harrow-sections 39 40, arranged to trail in rear of the toothed cylinders 19 20; but these harrow-sections are capable of adjustment so as to present their teeth at different inclinations to the surface of the ground. Each harrow-section consists of an angular metallic bar 41, having a series of teeth 42 secured firmly thereto. In practice I prefer to make the harrow-teeth in pairs from a single piece of metal which is of proper length in cross-sectional form and is doubled or bent to make two teeth joined or connected by an intermediate web portion, the latter being applied to the under side of the angular bar 41, so as to be secured thereto by bolts or rivets. Projecting upwardly from the ends of the angular bar 41 of each harrow-section are the quadrant-plates 43, which are secured firmly to said bar 41, said plates being provided with segmental slots 45 near their upper edges. The harrow-section is connected operatively with the cylinder-hangers by the employment of a pair of links 46, each link having at the rear end thereof the upwardly-extending arm 47. The quadrant-plates 43 of the harrow-section are arranged to overlap the arms 47 of the connecting-links, said plates being pivotally attached, as at 49, to the links, whereby the toothed bar 41 may be adjusted to present the teeth 42 in vertical or inclined positions. The harrow-section may be confined in the position to which its bar and teeth may be adjusted by means of the clamping-bolts 48, which are attached to the arms 47 of the links and pass through the segmental slots 45 of the plates on the toothed harrow-bar 41, said slots in the plates permitting the toothed bar to be turned on the pivots 49 for changing the angular relation of the teeth, while the bolts 48 operate to clamp the plates 43 to the links 46 in order to hold the toothed bar in its proper position. The links 46 are thus connected operatively with the ends of the toothed harrow-bar, said links extending forwardly from the bar and connected pivotally, as at 50, to the hangers 21 22 at points above the cylinder-axle 23. The pivotal attachment of the links to the cylinder-hangers at points above the axle 23 permits the weight of the harrow-bar and teeth to depress the harrow-section for the teeth to be held by gravity in operative positions, and the harrow-bar with the teeth are disposed in planes parallel to the axis of the toothed cylinder to secure efficiency in the operation of the structure to utilize the weight of the harrow-section as a means for partly counterpoising the weight of the machine and draft-tongue on the necks of the team, and to insure the adjustment of the harrow-sections with the cylinders when the latter are raised to throw the pulverizing devices out of service I provide the stay-chains 51, which are connected operatively with the harrow-sections and with lifter-bails 52, one lifter-bail being disposed in operative relation to each harrow-section and the spiked cylinder in rear of which said harrow-section is arranged. This lifter-bail is represented more clearly by Figs. 4 and 7 of the drawings, by reference to which it will be seen that the bail has the side bars formed with curved shoulders 53 at points intermediate of the length thereof, said side bars having their front ends formed to produce the downwardly-inclined arms 54, which are united by a cross-bar 55. The lifter-bail occupies a substantially-horizontal position between the weight-box and the spiked cylinder, the forward end of said bail extending beneath the rear cross-rail 12 of the machine-frame, while the rear end of the bail extends beyond the cylinder in order that the stay-chains 51 may be properly connected to said bail for the purpose of making an operative connection between the harrow-section and the lifter-bail. The front part of this lifter-bail is pivoted to a bracket 56, which is attached to the cross-rail 12 of the frame; but the arms 54 of said bail extend downwardly and forwardly beyond the pivotal attachment of the bail to the bracket in order that the cross-bar 55 may be connected with the rear end of a link 58. Said link is pivoted to a lever 57, which is fulcrumed on a segment 59, the latter being secured rigidly to the machine-frame, said lever carrying a spring-latch 60, which is manipulated by a hand-grip 61 for the purpose of moving the latch into or out of engagement with the notched segment.

It will be understood that each spiked cylinder and its complemental harrow-section are supported by the pair of hangers which have pivotal connection with the frame, that the harrow-section has pivotal connection with the cylinder-hangers for the purpose of permitting said harrow-section to trail in rear of and play loosely with respect to the spiked cylinder, that the lifter-bail is arranged to have its curved shoulders 53 operate against the weight-box over its proper spiked cylinder for the purpose of raising the weight-box and the cylinder and also lifting the harrow-section through the medium of the stay-chains, and that a lever is connected operatively to each lifter-bail, said lifter-bail having pivotal connection with the machine-frame at points above the pivotal connection of the cylinder-hangers to said frame. The employment of independent levers for the lifter-bails of the two cylinders and their complemental parts enables each cylinder and associated parts to be raised out of service or lowered into service independently one from the other, and as the cylinders are connected by independent pairs of hangers to the main frame they may play or move freely without hindrance, so that one cylinder may operate on ground at a different level from the ground which is subjected to the action of the other cylinder.

With each spiked cylinder is associated a cleaner-rake arranged to operate in the spaces between the spikes or teeth thereon for the purpose of keeping the cylinder in a condition free from accumulation of soil, weeds, roots, and other foreign matter, said cleaning-rake thus serving the useful purpose of promoting efficiency of the spading-cylinder. The cleaner-rake consists of an angular metallic bar 63 and the series of teeth 64, which are properly fastened to the angular bar to project from the under side thereof. This toothed bar of the cleaner-rake is arranged in rear of the weight-box, substantially parallel therewith, and occupies such relation to the horizontal plane of said weight-box as to bring its teeth 64 quite close to the surface of the cylinder, said teeth being arranged alternately with the teeth on the cylinder in order to operate in the spaces between said cylinder-teeth. Any suitable means may be provided for supporting the rake on the weight-box; but I prefer to yieldably mount the rake in place for the purpose of making said rake give to any obstruction, such as a root, which may become wedged between the teeth or spikes of the cylinder. This end is attained by the employment of brackets 65, which are fixed to the weight-box or the bottom thereof, and by pivotally connecting the ends of the rake-bar 63 to said brackets, thus mounting the rake to permit it to move in an upward and rearward direction. For the purpose of holding the rake in a depressed position and making its teeth occupy an active relation to a spiked cylinder I employ a spring 66, preferably of the coiled variety and having one end connected with the weight-box; but the other end of this spring is attached to a stop-plate 67, which is made fast with the upper side of the rake-bar, said stop-plate having upwardly-projecting fingers 67ª, adapted to bear against the weight-box for limiting the movement of the rake bar and teeth under the pressure or tension of the spring 66, all as clearly shown by Fig. 4.

The lifter-bail 52 carriers a presser-yoke 68, which is fastened to said bail between the curved shoulders 53 and the angular arms 54, and this presser-yoke occupies a position between the weight-box and the cross-rail 12 of the main frame, so that the yoke is positioned operatively to a presser-lug 69, which is fastened to the weight-box to extend beyond the front side thereof and to be engaged under certain conditions with the presser-yoke. By reference to Figs. 3 and 4 of the drawings it will be noted that either of the levers 57 may be moved in a backward direction for the link 58 to press against the front angular part of the lifter-bail, so as to make its curved shoulders bear against the bottom of the weight-box, whereby the lifter-bail is raised, and this action in turn elevates the weight-box, the cylinder, the hangers therefor, the rake, and the harrow-section, thereby throwing the operative devices on one side of the machine out of working position. The weight-box over each cylinder having been loaded to secure the desired pressure upon the cylinder, the lever 57 may be thrown in a forward direction in order to release the lifter-bail from restraint, whereupon the gravity of the load in the weight-box depresses the cylinder for its teeth to enter the ground, no matter how hard the soil may be, and at the same time the harrow-section is lowered to present its teeth in position to act on the soil to pulverize, smooth, and level the latter. The operation of lowering the lifter-bail by throwing the lever forward permits the presser-yoke 68 to engage with the lug 69 on the weight-box, and as the lifter-bail is connected with the machine-frame an upward movement of the weight-box, with the spiked cylinder and the hangers, is resisted by the presser-yoke 68, which is carried by the lifter-bail, thus keeping the spiked cylinder normally in active relation to the ground.

It is to be observed that each harrow-section may be adjusted on its carrying-links independently of the other harrow-section for the purpose of changing the position of its teeth from a vertical to an inclined position, or vice versa, and this adjustment of the harrow-section may be effected without interfering with the swinging play of the section with relation to the spiked cylinder.

By reference to Fig. 6 it will be noted that the teeth of the cleaner-rake are made in pairs—that is to say, a suitable length of metal is bent into substantially U shape to provide two teeth connected by an intermediate web—and the connected pair of teeth are fitted in the angle-bar 63 for the web to be united to said bar by rivets or bolts.

A spring seat-standard 70 is fastened to the draft-tongue 13 for the driver to ride upon the machine, said standard being fastened adjustably to the tongue by means of a bolt 71, which may be fitted in either of a series of apertures 72 in the draft-tongue. (See Fig. 1.)

From the foregoing description it is to be observed that the carrying-frame of my machine is equipped with wheels mounted on the crank-arms of a transverse axle and that the cylinder and devices which coact therewith are adapted to be raised or lowered by the manipulation of the levers, which are placed conveniently to the operator. The employment of the wheeled frame enables all of the earth-treating devices to be suspended out of engagement with the ground, so that the machine may be easily turned at one side of the field, or it can be readily drawn over rough roads and from one field to another. Any suitable draft appliance may be used in connection with the draft-tongue; but as such appliance is ordinary in the art I have not considered it necessary to illustrate the same.

Although I have shown and described my machine as equipped with a pair of cylinders, weight-boxes over said cylinders, two harrow-sections in rear of the cylinders, and independent cleaner-rakes supported by said boxes in active relation to the cylinders, all these parts being disposed for operation independently, as heretofore fully set forth, I do not desire to strictly confine myself to the construction of the machine in duplicate, because it is evident that a single cylinder and employment of devices such as described in connection with such single cylinder may be resorted to in construction of machines of comparatively small capacity.

Changes may be made in the form and proportion of some of the parts while their essential features are retained and the spirit of the invention embodied. Hence I do not desire to be limited to the precise form of all the parts as shown, reserving the right to vary therefrom.

Having thus described the invention, what I claim is—

1. A machine of the class described comprising a wheeled frame, a spading-cylinder connected with said frame to move freely in a vertical direction, a harrow-section trailing in rear of the spading-cylinder, and devices substantially such as described for lifting the spading-cylinder and harrow-section out of operative position, substantially as described.

2. A machine of the class described comprising a wheeled frame, a spading-cylinder connected operatively therewith, a weight-receptacle disposed above the cylinder to exert pressure thereon, a harrow-section trailing in rear of the cylinder, and means connecting the harrow-section with the cylinder-supports above the axis of rotation of said cylinder, substantially as described.

3. A machine of the class described comprising a wheeled frame, hangers connected pivotally with said frame, a cylinder journaled in said hangers and provided with spading-teeth, a weight-box mounted on said hangers above the plane of the cylinder, and a harrow-section connected with the hangers and trailing in rear of the cylinder, substantially as described.

4. A machine of the class described comprising a wheeled frame, hangers connected therewith and carrying a cylinder, a harrow-section trailing in rear of the cylinder, a lever, and devices connecting the cylinder-supporting devices and the harrow-section with said lever for imposing the weight of the parts upon the wheeled frame, substantially as described.

5. A machine of the class described comprising a wheeled frame, hangers pivoted thereto and carrying a spiked cylinder, a weight-box mounted on said hangers, a harrow-section linked to the cylinder-hangers at points above the axle of the cylinder, and a lifting contrivance mounted on the wheeled frame and having an active relation to the harrow-section and the cylinder-supporting contrivance, whereby the weight of the parts may be imposed upon the wheeled frame, substantially as described.

6. A machine of the class described comprising a wheeled frame, hangers pivoted thereto and carrying a spiked cylinder and a weight-box, a harrow-section connected with said hangers to trail in rear of the spiked cylinder, a lifter-bail pivoted on said frame and arranged between the cylinder and weight-box to act against the latter, means connecting the harrow-section with said lifter-bail, and the lever linked to said bail, substantially as described.

7. A machine of the class described comprising a wheeled frame, hangers connected therewith and carrying a toothed cylinder and a weight-box, a lifting-bail pivoted on said frame and having the curved shoulders to bear against the weight-box, a harrow-section linked to the cylinder-hangers and connected operatively with said bail, and a lever connected to the lifter-bail, substantially as described.

8. A machine of the class described comprising a wheeled frame, hangers pivoted to said frame and carrying the spiked cylinder and a weight-box, a lifter-bail pivoted on the frame and arranged to bear against said weight-box, a lever, and a pressure device carried by the lifter-bail and arranged to offer resistance to the upward play to the weight-box and spiked cylinder, substantially as described.

9. In a machine of the class described, the combination with a frame, of a spiked cylinder connected with said frame, a weight-box arranged to normally depress the cylinder, a lifting device connected with the frame and disposed in active relation to said box, and a resistance device carried by the weight-box to impede or retard the upward play of the spiked cylinder, substantially as described.

10. In a machine of the class described, the combination with a wheeled frame, of hangers connected pivotally thereto and carrying a spiked cylinder and a weight-box, and a cleaner-rake mounted on the weight-box in active relation to the cyinder, said cleaner-rake being adjustable with the cylinder and weight-box, substantially as described.

11. In a machine of the class described, the combination with a frame, of hangers pivoted thereto and carrying a spiked cylinder and a weight-box, a cleaner-rake having teeth arranged alternately to the cylinder-teeth and mounted pivotally on said weight-box, a tension device for holding the cleaner-rake for its teeth to occupy an active relation to the cylinder, and means for limiting the movement of the cleaner-rake under the action of its tension device, substantially as described.

12. In a machine of the character described, the combination with a frame, of hangers pivoted thereto and carrying a spiked cylinder, links pivoted to said hangers, and a toothed harrow-bar connected pivotally to said links and having means for clamping said harrow-bar adjustably to said links for presenting its teeth in vertical or inclined positions, substantially as described.

13. In a machine of the class described, the combination with a frame, of hangers pivotally connected therewith and carrying a spiked cylinder, links pivoted to said hangers, a toothed harrow-bar, slotted plates fast with the harrow-bar and having pivotal connection with said links, and clamping devices between the slotted plates and links to adjustably confine the harrow-bar on said links, substantially as described.

14. In a machine of the class described, a spading-cylinder consisting of the heads, a series of sections attached to said heads, and curved teeth secured in series to the cylinder-sections and having the diamond-shaped points, substantially as described.

15. In a machine of the class described, a spading-cylinder consisting of a shaft, the heads mounted loosely on said shaft, a series of cylinder-sections secured to said heads, and curved pointed teeth secured in staggered relation to the cylinder-sections, substantially as described.

16. In a machine of the class described, a spading-cylinder provided with a series of curved pointed teeth, each tooth comprising a shank which fits in a flared opening of the cylinder and is wedged therein by adjustment of a clamping-nut, and comprising a body portion which is bent rearwardly and then outwardly and radially of the cylinder, the radially-extending portion having its extremity pointed, substantially as described.

17. A machine of the class described comprising a wheeled frame, independent pairs of hangers connected pivotally to said frame, each pair of hangers carrying a cylinder-axle, independent cylinders mounted idly on said axles to play freely with the pair of pivoted hangers, a weight-box mounted on each pair of hangers over the cylinder journaled therein, and means for adjusting each pair of hangers and its devices independently of the other pair of hangers, substantially as described.

18. A machine of the class described comprising a wheeled frame, independent pairs of hangers connected pivotally and individually to said frame and each pair carrying a cylinder-axle, a spading-cylinder and weight-box mounted in each pair of hangers, harrow-sections connected individually with the pairs of hangers to trail in rear of the cylinders, and independent lifting devices mounted on the frame and disposed in active relation to the cylinder-supporting devices and the harrow-sections for operating the same independently, substantially as described.

In testimony that I claim the foregoing as my own I have hereto affixed my signature in the presence of two witnesses.

LOUIS GEO. KRUEGER.

Witnesses:
RICHARD ELSNER,
HENRY HEUMANN.